June 4, 1963
W. MacWILLIAM
3,092,404
PACKED SCREW THREADED GLAND TYPE TUBE
COUPLING FOR THIN WALLED TUBING
Original Filed Sept. 13, 1957
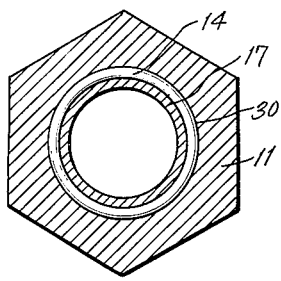
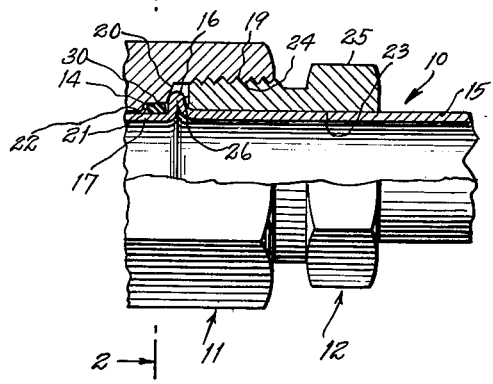
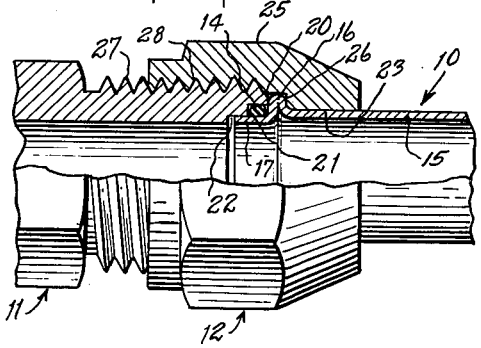
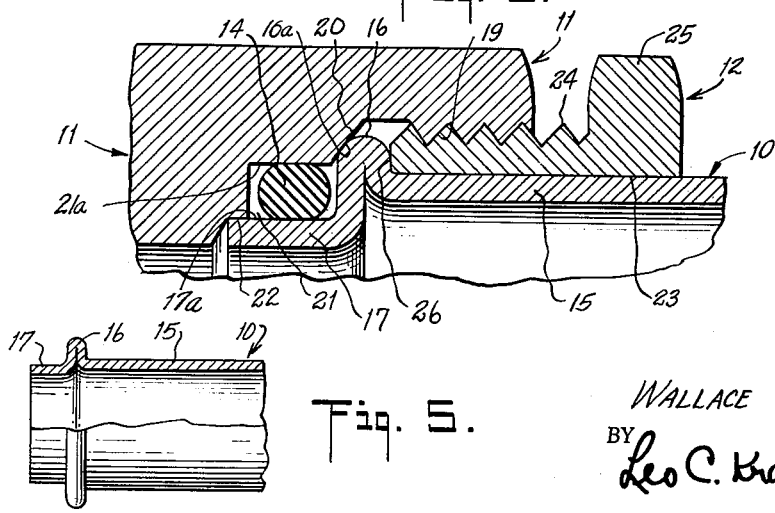
INVENTOR.
WALLACE MacWILLIAM
BY Leo C. Krazinski
ATTORNEY

United States Patent Office 3,092,404
Patented June 4, 1963

3,092,404
PACKED SCREW THREADED GLAND TYPE TUBE COUPLING FOR THIN WALLED TUBING
Wallace MacWilliam, 363 Crest Road, Ridgewood, N.J.
Continuation of applications Ser. No. 683,852, Sept. 13, 1957, and Ser. No. 845,572, Oct. 9, 1959. This application Jan. 25, 1961, Ser. No. 85,956
4 Claims. (Cl. 285—334.4)

The present invention relates to couplings and, more particularly, to improved couplings for thin walled tubes.

The present invention is primarily concerned with improved couplings of the type which comprise a male member and a female member having cooperating shoulders for clamping an annular flange or similar formation on a tube and a sealing ring or gasket therebetween to seal the tube to the opening of a fitting or the like.

Accordingly, an object of the present invention is to provide such a coupling wherein a sealing ring forms the primary seal and the tube and coupling members are constructed and arranged to form a secondary metal to metal seal.

Another object is to provide such a coupling wherein the coupling members are readily adjusted to provide a tight and reliable metal to metal seal in the event the sealing ring or gasket is impaired, whereby replacement of the ring or gasket is not necessitated immediately but can be deferred until replacement thereof is convenient.

A further object is to accomplish the foregoing in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a thin walled tube formed with an external annular bead or upset portion and having a cylindrical portion or pilot of reduced diameter extending from the bead to the free end thereof, a member formed with a male thread, a member formed with a female thread for receiving the male thread, one of the members being formed with an internal, annular recess and having a shoulder at one side of the recess and having a cylindrical bore at the other side of the recess into which the portion of reduced diameter extends, and a sealing ring or gasket in the recess, the other of the members having a bore through which the tube extends and having a shoulder at one end of its bore which engages the other side of the bead to cause the bead to retain the sealing ring within the recess and to cause the bead to engage the first mentioned shoulder and thereby prevent rotation of the tube.

In the drawings:

FIG. 1 is a fragmentary side view, partly in elevation and partly in section, of a tube connection including a tube and coupling members illustrating one embodiment of the present invention.

FIG. 2 is a sectional view taken along the line 2—2 of FIG. 1.

FIG. 3 is an enlarged sectional view of the tube and coupling arrangement of FIG. 1 showing in greater detail the sealing ring.

FIG. 4 is a view similar to FIG. 1 illustrating another embodiment of the invention.

FIG. 5 is a fragmentary side view of the tube in accordance with the present invention, shown partly in elevation and partly in section.

Referring now to the drawing in detail, there is shown a tube connection which generally comprises a thin walled tube 10, a coupling member 11, such as a valve, fitting or the like of which only a portion is shown, a second coupling member 12 adapted for securement to the member 11, and a sealing ring or gasket 14.

As shown in FIGS. 1, 3, 4 and 5, the tube 10 has a portion 15 of normal diameter, an external annular bead or upset portion 16 adjacent the end thereof, and a cylindrical portion or pilot 17 of reduced diameter extending from the bead to its free end. The bead 16 and the portion of reduced diameter 17 can be formed in any suitable manner, for example, by means of a die or other tool which first forms an internal groove while extending a portion of the tube outwardly and constricting the end portion of the tube to reduce its diameter and then collapse the groove to provide a bead having a generally circular cross-section for the purpose described hereinafter.

The sealing ring or gasket 14 which is disposed on the outer surface 17a of the end 17 may be an O-ring or a ring having a rectangular cross-section which is constructed of compressible material and is suitably dimensioned for the purpose to be described.

The portion of the coupling member 11, shown in FIGS. 1 and 3, is a boss formed with an opening. The opening has a female thread 19 adjacent its outer end, a shoulder 20 adjacent the inner end of the thread 19, an internal annular recess 21 adjacent the shoulder or abutment surface 20, and a cylindrical bore 22 adjacent the inner end of the recess. The ring 14 engages the sealing surface 21a of the recess or cavity 21.

The coupling member 12, shown in FIGS. 1 and 3, is a bushing which has a bore 23, a male thread 24 on its inner portion, a nut formation 25 at its outer end, and a shoulder or end face 26 at its inner end. As may be seen from the drawing, the bore 23 is made a close fit with the surface of the tube 15 for providing a snug, embracing engagement of the tube wall. Further, the axial length of the contact surface of the bore 23 is made of a length ratio with respect to the length of the short radially extending wall of the bead 16 of at least four to one. Obviously such a ratio and snug fit would prevent the bead 16 from slipping past the wall of the bore 23.

The portion of the coupling member 11, shown in FIG. 4, is a nipple formed with an opening and a male thread 27. The nipple has a shoulder or end face 20 at its outer end, an internal annular recess 21 adjacent the shoulder, and a cylindrical bore 22 adjacent the inner end of the recess 21.

The coupling member 12, shown in FIG. 4, is a nut which has a bore 23 at its outer end, a female thread 28 at its inner end, an internal shoulder 26 between the bore 23 and the thread 28, and a nut formation 25 at its exterior surface.

In both embodiments of the present invention the portion 15 of the tube extends through the bore 23, the reduced portion 17 of the tube is snugly fitted into the smaller bore 22, and the sealing ring 14 is seated in the recess 21 to surround the tube portion 17 between the surfaces 17a and 21a. When the coupling members are threadedly secured, the shoulder 26 engages one side of the bead 16 and the other side of the bead or the abutment surface 16a engages the shoulder or abutment surface 20 in initial, line seal engagement. This mechanical, line seal engagement is particularly advantageous in that it reduces the wear and tear on the sealing ring while in service. It has been found in conventional practice, that is, without the mechanical, line seal engagement of applicant's invention, that hydraulic impulses in the system rotate the tube circumferentially, each impulse causing the sealing ring to bind both against the wall of the fitting and against the pilot 17 while simultaneously causing the pilot to rotate. As a result of the frictional engagement between the sealing ring on one hand and the fitting and rotating pilot on the other hand, the sealing ring tends to wear down and fail prematurely.

In order to provide an effective primary seal about the pilot or reduced tube portion 17, the cross section of the sealing ring 14 is so dimensioned that its vertical dimension is greater than the vertical space in the recess 21, whereby the ring is vertically compressed and expanded laterally within the recess. As shown in FIG. 3, space is provided to the right and left of the compressed sealing ring 14 in the recess 21 to allow for a further expansion of about ten percent (10%) when the sealing ring is subjected to oil and the like. While the tube is under pressure, the space at the right is filled, while the space at the left is filled when the tube is under suction. The assembly of this primary seal can be facilitated by providing the recess 21 with an inwardly converging wall 30 (FIG. 1) which enables the ring to be readily inserted into the recess. The wall 30 is inclined at an angle of about 5° to the horizontal, as viewed.

In the event the gasket deteriorates and becomes impaired, the primary seal is rendered ineffective at the point where the bead 16 engages the shoulder 20. It might be mentioned at this point that it is only necessary originally to hand tighten both couplings to provide the original primary seal. Leakage at this point can then be prevented by wrench tightening the coupling members, since a very low torque was initially required for the primary seal, whereby the bead 16 is now compressed against the shoulder 20 to provide a more effective metal to metal secondary seal.

This secondary seal is greatly improved by inclining the shoulder 20 (see FIG. 1) about twenty degrees to the vertical, as viewed, and utilizing a bead 16 of generally circular contour, whereby the shoulder and the bead provide a more substantial metal to metal engagement, as compared to the initial line seal engagement.

From the foregoing description, it will be seen that the present invention provides an improved tube connection which has primary and secondary seals, whereby immediate replacement of the sealing ring is not required in the event it is impaired. The coupling members and the tube which provide such an improved sealing arrangement can be manufactured in a simple and economical manner and can withstand the conditions to which they are exposed.

Further, the invention provides a novel means, namely, a tubular portion 17 of reduced diameter which (a) allows adequate space for the sealing ring, (b) allows greater height in the upset wall or bead 16 for accommodating the sealing ring 14 and (c) permits sufficient wall thickness for a compact male or female fitting, thereby enabling use of a fitting having the same overall size as conventionally flared fittings for the respective tube sizes. Heretofore, heavier and larger couplings have been required. Thus, it is seen that this invention provides a bead of sufficient depth or height to accommodate the conventional O ring or gasket while at the same time the invention provides a metal to metal surface seal between the component parts.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

This application is a continuation of my application Serial No. 845,572, filed October 9, 1959, which was a continuation of my application Serial No. 683,852, filed September 13, 1957; both applications are now abandoned.

I claim:

1. In combination, a tube of uniform thickness, a bead on the tube, a body member having a bore therein, a coupling member, means engaging the coupling member with the body member, and a sealing ring positioned over an end portion of the tube, the coupling member urging the bead against the body member, the improvement wherein said end portion of the tube is cylindrical and is of lesser diameter than the diameter of the tube on the other side of the bead, the bead thereby having a first radial wall at one side thereof adjacent said end portion of one area and a second radial wall at the other side of said bead of lesser area than that of said first radial wall, said bead having its inner walls in contact, said bead being of generally semi-circular configuration, said body member having an enlarged portion of the bore receiving the end portion of said tube, said body member having a further enlarged portion of its bore outwardly of said first enlarged portion forming a cylindrical recess for the sealing ring formed by two intersecting walls, one of said intersecting walls being substantially radially disposed and the other of said intersecting walls being substantially axially disposed, said body member having a still further enlarged portion of its bore extending outwardly at an obtuse angle from said axially disposed wall and providing a contact surface for said bead above said axially disposed wall, said contact surface holding the tube in firm engagement and thereby preventing rotation of the tube and providing a metal to metal seal, the sealing ring engaged between the end portion of the tube and the sealing recess axial wall thereby providing an O ring seal, the diameter of the opening in the coupling member being such as to provide a close fit with the surface of the tube opposite the end portion of lesser diameter, said coupling member having a tube engaging portion of an axial length at least four times the length of said second radial wall of lesser area against which it abuts.

2. A tube connection for a thin walled beaded tube of uniform thickness of the type formed with an external annular bead and a cylindrical portion of reduced diameter extending from one side of said bead to a free end thereof, said cylindrical portion of reduced diameter being of lesser diameter than the diameter of said tube at the other side of said bead, said bead being constituted by a reversely bent portion of the tube wall having its inner walls in contact outwardly of the outside diameter of the portion of the tube of greater diameter, and having a radial wall at one side thereof adjacent said reduced portion and a radial wall of lesser area than said first radial wall at the other side thereof, said bead being of generally semi-circular configuration with its center outwardly of the outside diameter of the portion of the tube of greater diameter, said tube connection comprising a pair of members, means for threadedly interconnecting said members, one of said members having an internal annular gasket recess formed by two intersecting walls, one of said intersecting walls being substantially radially disposed and the other of said intersecting walls being substantially axially disposed, an O-ring gasket in the gasket recess, a shoulder at one side of said gasket recess, said shoulder being constituted by a wall extending outwardly at an obtuse angle from said axially disposed wall and being adapted to engage said bead above said axially disposed intersecting wall, said one of said members also having a cylindrical bore at the other side of said recess into which said portion of reduced diameter extends, said intersecting walls being adapted to cooperate with said first radial wall of said bead and with said reduced cylindrical portion of said tube to confine said sealing ring within the gasket recess, the other of said members having a bore through which the tube is adapted to extend and having a shoulder at one end of said bore adapted to engage said radial wall of lesser area on the other side of said bead to force said bead into engagement with said shoulder wall above said axial wall and thereby prevent rotation of the tube relative to said members, the diameter of the opening in the other of said members being such as to provide a close fit with the surface of the tubing opposite the portion of reduced diameter, said other of said members having a tube engaging portion of an axial length at least four times the length of the radial wall of lesser area against which its said shoulder abuts.

3. In combination, a tube of uniform thickness, a bead on the tube, a female body member having an end portion with a bore therethrough, male coupling member snugly embracing said tube and having a threaded end portion, a face at the end of said threaded end portion, said female body member having an internally threaded, axial wall portion overlapping the threaded portion of said male coupling member, and a sealing ring positioned over an end portion of the tube, said end portion of the tube being cylindrical and being of lesser diameter than the diameter of the tube on the other side of the bead, said bead having its inner walls in contact outwardly of the outside diameter of the portion of the tube of greater diameter, said bead being of generally semi-circular configuration with its center outwardly of the outside diameter of the portion of the tube of greater diameter, said bead having a first radial wall at one side thereof adjacent said end portion of one area and a second radial wall at the other side of said bead of lesser area than that of said first radial wall, said female body member having an enlarged portion of its bore receiving the end portion of lesser diameter of said tube, said female body member having a further enlarged portion of its bore outwardly of said first enlarged portion forming a sealing ring cylindrical recess by two intersecting walls, one of said intersecting walls being substantially radially disposed and the other of said intersecting walls being substantially axially disposed, said female body member having a still further enlarged portion of its bore with its inner end wall flaring outwardly at an obtuse angle of about 110° from said axially disposed wall and with its axial wall threaded and mating with said male threaded end portion, said threaded end portion face of said male member bearing against said second radial wall of lesser area and with the semi-circular bead extending into said still further enlarged bore portion and having a line contact between said semi-circular bead and said flared surface of said female body member, said line contact surface holding the tube in firm engagement and thus preventing rotation of the tube and providing a metal to metal seal, the sealing ring being engaged between said end portion of lesser diameter of the tube and the sealing recess axial wall.

4. In combination, a tube of uniform thickness, a bead on the tube, a female body member having an end portion with a bore therethrough, a male coupling member snugly embracing said tube and having a threaded end portion, a face at the end of said threaded end portion, said female body member having an internally threaded, axial wall portion overlapping the threaded portion of said male coupling member, and a sealing ring positioned over an end portion of the tube, said end portion of the tube being cylindrical and being of lesser diameter than the diameter of the tube on the other side of the bead, said bead having its inner walls in contact outwardly of the outside diameter of the portion of the tube of greater diameter, said bead being of generally semi-circular configuration with its center outwardly of the outside diameter of the portion of the tube of greater diameter, said bead having a first radial wall at one side thereof adjacent said end portion of one area and a second radial wall at the other side of said bead of lesser area than that of said first radial wall, said female body member having an enlarged portion of its bore receiving the end portion of lesser diameter of said tube, said female body member having a further enlarged portion of its bore outwardly of said first enlarged portion forming a sealing ring cylindrical recess by two intersecting walls, one of said intersecting walls being substantially radially disposed and the other of said intersecting walls being substantially axially disposed, said female body member having a still further enlarged portion of its bore with its inner end wall flaring outwardly at an obtuse angle not to exceed 135° from said axially disposed wall and with its axial wall threaded and mating with said male threaded end portion, said threaded end portion face of said male member bearing against said second radial wall of lesser area and with the semi-circular bead extending into said still further enlarged bore portion and having a line contact between said semi-circular bead and said flared surface of said female body member, said line contact surface holding the tube in firm engagement and thus preventing rotation of the tube and providing a metal to metal seal, the sealing ring being engaged between said end portion of lesser diameter of the tube and the sealing recess axial wall.

References Cited in the file of this patent

UNITED STATES PATENTS

| | | |
|---|---|---|
| 1,152,858 | Stewart | Sept. 7, 1915 |
| 1,533,886 | Mueller | Apr. 14, 1925 |
| 2,123,999 | Lourer | July 19, 1938 |
| 2,268,142 | Lusher | Dec. 30, 1941 |
| 2,441,344 | Bosworth | May 18, 1948 |
| 2,452,890 | Wolfram | Nov. 2, 1948 |
| 2,469,851 | Stecher | May 10, 1949 |
| 2,477,677 | Woodling | Aug. 2, 1949 |
| 2,477,969 | Donner | Aug. 2, 1949 |
| 2,661,965 | Parmesan | Dec. 8, 1953 |
| 2,685,461 | Mueller | Aug. 3, 1954 |
| 2,825,588 | Howard | Mar. 4, 1958 |
| 2,833,568 | Corsette | May 6, 1958 |

FOREIGN PATENTS

| | | |
|---|---|---|
| 453,217 | Great Britain | May 19, 1936 |